Patented Oct. 3, 1950

2,524,089

UNITED STATES PATENT OFFICE 2,524,089

PROCESS OF PRODUCING SUBTILIN

Joseph J. Stubbs, Frederick, Md., and Robert E. Feeney, El Cerrito, John A. Garibaldi, San Francisco, and Irvin C. Feustel, Berkeley, Calif., assignors to the United States of America as represented by the Secretary of Agriculture No Drawing. Application September 26, 1947, Serial No. 776,397

9 Claims. (Cl. 195—96)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to subtilin and has as its prime object the provision of a process for the production of subtilin by the submerged culture of *Bacillus subtilis*. Another object is the utilization of vegetable waste products, such as asparagus juice, as media for the culturing of *Bacillus subtilis*, under submerged conditions, to produce subtilin. A further object is the utilization of sugar beet molasses and a "synthetic" medium containing amino acids, yeast extract, protein hydrolysate, and mineral salts, as culture media for the submerged culturing of *Bacillus subtilis* in the production of subtilin. Other objects will be apparent from the description of the invention.

Subtilin is an antibiotic produced by a particular strain of *Bacillus subtilis* and has antibiotic activity against a number of pathogenic organisms including *Bacillus anthracis, Diplococcus pneumoniae, Neisseria gonorrhoeae*, and *Mycobacterium tuberculosis*. Heretofore, subtilin has been prepared by surface culture. Humfeld et al., Proc. Soc. Expt. Biol. and Med., 1943, 54, pp. 232–235; Jansen et al., Arch. Biochem., 1944, 4, pp. 297–309. This surface culture method, however, is comparatively slow and requires large size apparatus to produce any appreciable quantity of the antibiotic.

We have now found that subtilin can be produced by a submerged culture technique whereby high yields are obtained in a short time and a comparatively small apparatus can turn out substantial quantities of the desired material.

In general, the invention provides a process for producing subtilin which involves inoculating a sterile nutrient medium with a subtilin-producing strain of *Bacillus subtilis* and incubating the resulting culture under aerobic, submerged conditions until a substantial amount of subtilin is produced. Best yields of subtilin are obtained when the aerobic conditions utilized in the process involve the introduction of air into the culture at the rate of at least 0.2 volume of air per minute per volume of culture.

During the course of the incubation, samples of the culture are withdrawn at intervals, tested for pH and cell volume, and assayed for subtilin content.

The cell volume was determined by centrifuging a sample of the culture for 20 minutes at 3400 R. P. M. Cell volume, as used herein, is the ratio of the volume of the lower layer (mostly cellular material) in the centrifuge tube to the total volume of material in the tube. Determination of cell volume is important, as knowledge thereof indicates the time when the operation should be shut down and harvested. Assays for subtilin are somewhat time consuming, and the progress of the culture cannot be followed by simultaneous assay for subtilin content. However, the cell volume can be determined in 20 minutes, and the progress of the culture can thus be easily followed. It has been observed that after maximum cell volume is obtained, the maximum yield of subtilin follows in 2 to 3 hours. Thus, if the culture is harvested several hours after maximum cell volume is obtained, the highest yield of antibiotic can be obtained.

Subtilin was assayed by a short incubation period turbidimetric bacteriostatic method similar to that described by McMahan (Jour. Biol. Chem., vol. 153, p. 249 (1944)) for penicillin. In this assay, the samples of culture were assayed against a standard sample of isolated subtilin using *Micrococcus conglomeratus* as the test organism. Subtilin yields are expressed in milligrams per liter of culture medium as determined against this standard. The assay may also be determined against *Staphylococcus aureus* or *Streptococcus faecalis*.

Many different types of apparatus can be used to carry out the submerged culture. The experiments described in the examples appearing hereinafter were carried out in a sterile fermenting apparatus similar to that described by Feustel and Humfeld in the Journal of Bacteriology, vol. 52, pp. 229–235 (1946).

Many other types of apparatus can be used. The essentials to be provided are a vessel equipped with stirring device and with means for introducing air during the incubation. Many refinements can be added such as thermometers, heating or cooling jackets, sampling devices, inlets for introducing materials, mechanical foam breakers, and so forth. It is preferable to employ some stirring or agitating device to disperse the air entering the system with the medium. Such device may be a mechanical agitator, for example. However, it is also possible to utilize the air entering the system for agitation as well as for the metabolism of the organism. To this end air may be introduced through orifices whereby turbulence of the culture medium will be obtained. Another method of providing agitation involves continuously circulating the culture medium through a pump. In such case the air may be introduced directly into the pump or into the pump line whereby it will be thoroughly dispersed into the culture medium.

The following examples illustrate particular conditions, steps, and materials within the scope of this invention. These examples illustrate procedures found to give satisfactory results, but are not to be taken as a limitation of the scope of this invention to these particular procedures.

EXAMPLE I

An asparagus juice concentrate was prepared as follows:

Fresh asparagus butts and asparagus spears (culls) were disintegrated in a hammer mill, the crushed material put through a screw press and the juice collected. This juice was then placed in a tank and the pH adjusted to about 5.0 by addition of sulfuric acid. The juice was then stirred for about 4 hours at a temperature of about 50° C., this digestion having the purpose of solubilizing certain nitrogenous materials present in the juice and thus enhancing its nutritive value. At the end of the digestion period, the temperature was raised to about 80° C. to coagulate suspended material. After filtration of this suspended material, the juice was evaporated under vacuum to a solids content of 65% to 70%.

An excellent medium for submerged production of subtilin can be made according to the above technique. Variations are possible in the process to get approximately equivalent results. In the digestion step, the pH can be adjusted with any acid which is not toxic to the subtilis organism such as hydrochloric acid, phosphoric acid, acetic acid, and so forth. Regardless of what acid is used, the pH should be within the range of about 4.5 to about 5.5. The digestion is best accomplished at 50° C., but the temperature range of about from 40° C. to about 60° C. gives good results. The final heating to coagulate the insoluble material is accomplished at any temperature from about 75° C. to about 100° C. The evaporation to concentrate the juice is only necessary to reduce cost of shipping and prevent spoiling if it is to be stored. If desired, the evaporation in vacuum can be replaced by spray drying or other concentrating methods. In practice, asparagus butts and spears (culls) are used to make the juice. This is merely a matter of economy as such materials are easily obtained as waste from canneries. Further details as to the preparation of asparagus juice concentrate are disclosed in U. S. Department of Agriculture mimeographed circular AIC-70.

An asparagus juice concentrate of about 68% solids, prepared as described above, was diluted with sufficient tap water to give a solution of 10.9% solids. One liter of this solution was steamed for 20 minutes to sterilize it, then cooled and the pH adjusted to 6.9 to 7.0 by the addition of sodium hydroxide. To this solution was then added 70 ml. of *B. subtilis* inoculum which had been grown on the same medium in surface culture, and the inoculated medium was then placed in a sterile fermenter. A water bath surrounding the fermenter was maintained at 35° C. The agitator was operated at 1750 R. P. M. and air pumped into the bottom of the fermenter at the rate of 1 liter per minute per liter of medium. At intervals, samples of the culture were withdrawn, tested for pH, cell volume, and assayed for subtilin content.

Table 1 following indicates the results obtained.

Table 1

| Time hours | pH | Cell volume, Per Cent | Subtilin, mg./liter of culture |
|---|---|---|---|
| 2 | 6.8 | 0.9 | 12 |
| 3 | 6.7 | 1.2 | 16 |
| 4 | 6.5 | 2.0 | 32 |
| 5 | 6.4 | 3.4 | 40 |
| 6 | 6.4 | 5.5 | 60 |
| 7 | 6.6 | 8.7 | |
| 8 | 6.4 | 18 | 149 |
| 9 | 7.1 | 28 | 436 |
| 10 | | 28 | 816 |
| 11 | | 24 | 1,260 |
| 12 | | 24 | 1,260 |
| 13 | | 26 | 1-290 |
| 14 | | | 1,236 |

EXAMPLE II 250 grams of sugar beet molasses (58.8% total sugar, 82% total solids) was dissolved in sufficient water to give 1 liter of solution. To this solution was added 8 grams of diammonium phosphate and 50 parts per million of manganese (added as manganese chloride). This medium was then steamed for 20 minutes to sterilize it, cooled, and adjusted to a pH of 6.9 by addition of sodium hydroxide. To this medium was then added about 70 ml. of *B. subtilis* inoculum which had been grown on the same medium. The inoculated medium was then placed in a sterile fermenter. The water bath surrounding the fermenter was maintained at 35° C., the speed of the agitator was 1750 R. P. M., and air was introduced at the rate of 1 liter per minute. The following results were obtained:

Table 2

| Time, hours | pH | Cell volume, Per cent | Subtilin, mg./liter of culture |
|---|---|---|---|
| 1 | 6.9 | 1.1 | |
| 2 | 6.9 | 1.4 | |
| 3 | 7.0 | 1.5 | 25 |
| 4 | 7.0 | 2 | 27 |
| 5 | 6.7 | 4 | 31 |
| 6 | 6.5 | 11 | 24 |
| 7 | 6.8 | 16.5 | 36 |
| 8 | | | 140 |
| 9 | 6.7 | 27 | 310 |
| 10 | 6.9 | 31 | 700 |
| 11 | 6.4 | 24 | 772 |
| 12 | 7.6 | 25 | 880 |
| 13 | | | 1,130 |
| 14 | 7.5 | | 1,230 |

EXAMPLE III

A "synthetic" medium was made up as follows:

Sucrose, 100 g.; asparagine, 3 g.; glutamic acid, 3 g.; a mixture of nitrogenous substances (obtained by hydrolyzing casein in the presence of hydrochloric acid, which mixture contained about 10% nitrogen), 6 g.; yeast extract, 4 g.; $(NH_4)_2HPO_4$, 8 g.; $MnSO_4.H_2O$, 0.15 g.; tryptophane, 0.1 g.; concentrated sulphuric acid, 3 ml.; salt mixture, 10 ml.; distilled water, sufficient to give 1 liter of solution. The salt mixture contained the following salts per liter of solution: $FeCl_3.6H_2O$, 0.97 g.; $MnCl_2.4H_2O$, 0.72 g.; $MoO_3$, 0.15 g.; $CuSO_4$, 0.5 g.; $ZnCl_2$, 0.21 g.; $CaCl_2$, 13.9 g.; $MgCl_2.6H_2O$, 41.8 g.; KCl, 9.6 g.

This solution was steamed for 20 minutes to sterilize it, then cooled, and the pH adjusted to about 7 by the addition of sodium hydroxide. To this solution was added 70 ml. of *B. subtilis* inoculum grown on the same medium. The inoculated medium was then placed in a sterile fermenter. The water bath surrounding the fermenter was maintained at 35° C., the speed of the agitator was 1750 R. P. M., and air was introduced at the rate of 1 liter per minute. The following results were obtained:

Table 3

| Time, hours | pH | Cell volume, percent | Subtilin, mg./liter of culture |
|---|---|---|---|
| 1 | 6.6 | 2.5 | |
| 2 | 6.2 | 2.5 | |
| 3 | 6.3 | 5.0 | 70 |
| 4 | 6.3 | 8.5 | 107 |
| 5 | 6.3 | 17 | 214 |
| 6 | 6.0 | 28 | 298 |
| 7 | 5.2 | 26 | 616 |
| 8 | | | 620 |
| 9 | 5.5 | 28 | 556 |
| 10 | 5.9 | 22 | 536 |
| 11 | 5.8 | | 560 |

EXAMPLE IV

An experiment was carried out in a large-scale fermenter. This fermenter, though larger in size, was equipped in much the same way as the fermenter heretofore employed. 150 liters of asparagus juice containing 8% solids (prepared by dilution of the asparagus juice concentrate described in Example I) was sterilized and adjusted to pH of 6.9 by addition of sodium hydroxide. The juice was inoculated with B. subtilis and pumped into the fermenter. The air flow was maintained at 150 liters of air per minute and the temperature of the fermenter jacket maintained at 35° C. The operation was shut down after 9 hours, and a yield of 120 grams of subtilin was obtained.

The culture employed in the experiments described in the examples above was a strain of Bacillus subtilis designated in the stock culture collection of the United States Department of Agriculture, Northern Regional Research Laboratory, as B-543. This culture was stored in agar plants. For preparing inocula for submerged culture, transplants were made into 500 ml. volumes of experimental media in Fernbach flasks and incubated for 20 to 24 hours. The contents of the flask were then thoroughly agitated and 50 to 100 ml. of the resulting suspension used to inoculate 1 liter of culture medium. It was found that the amount of inoculum added was not critical. The inocula could also be prepared on a small scale under submerged conditions according to the process herein described. High yields of subtilin in the shortest possible time can be produced if the inoculum is grown under submerged conditions on the same medium as the culture to be employed in subtilin production and the inoculation carried out at the point when the cell production rate is at a maximum in the inoculum culture. It was found that it is not essential to use the B-543 strain of B. subtilis. Other strains of B. subtilis which yield subtilin can be used.

The B. subtilis may be cultured in many different media. The asparagus juice medium describe in Example I gives high yields of subtilin and is low in cost, since it is produced from asparagus butts and spears (culls) which are available in large quantities as waste in asparagus canning. This asparagus juice is available as a concentrate and should be diluted with water to about 5% to about 20% solids. Since the higher concentrations provide more nutrient material, it is obvious that they are preferred to obtain the highest yield of subtilin in one cycle of operation. Juice prepared by steaming and pressing asparagus spears or asparagus butts and filtering the liquid obtained, can also be used. This juice is somewhat lower in nitrogen content than the juice prepared by the digestion method set forth above and thus has somewhat less nutritive value. A suitable medium can also be prepared by diluting beet sugar molasses with water and preferably adding mineral salts such as ammonium phosphate and manganese salts. Synthetic media containing sugar, amino acids, yeast extract, and mineral salts can also be used. In general, the medium should contain water, a carbohydrate, a source of nitrogen, and mineral salts. The carbohydrate may be sucrose, glucose, starch, invert sugar, etc. The source of nitrogen may be a protein, amino acids such as obtained by hydrolysis of proteins, ammonia, ammonium salts, urea, etc. With regard to mineral salts the medium should contain sulphates and phosphates which may be conveniently supplied by their alkali metal or ammonium salts. Further traces of the following elements are necessary, i. e., potassium, magnesium, iron, zinc, and manganese.

The pH of the culture may vary from about 5.5 to about 7.5. Preferably, the pH is adjusted to about from 6.5 to 7.0 at the start of the incubation, and no attempt need be made thereafter to maintain the pH constant during the production cycle. pH's higher than about 7.0 have the disadvantage but excessive foaming is more apt to occur.

The temperature of the submerged culture can be varied from about 30° C. to about 40° C., best results generally being obtained at about 35° C. At temperatures higher than about 35° C., subtilin is produced at a faster rate, but the final yield of subtilin decreases markedly, while at temperatures below about 35° C., the production of subtilin is slow, and thus the operation must be continued for a longer period of time to obtain maximum yield of subtilin. A convenient method of obtaining a high yield of subtilin in a shortened period of time is by employing a temperature above 35° C. (up to about 40° C.) during the initial period of growth, and then decreasing the temperature to about 35° C. when maximum cell volume is obtained. In this manner, the rate of multiplication of the cells is enhanced by the increased temperature, and the production of subtilin, which lags behind the cell production, is enhanced by the lower temperature maintained after maximum cell formation has been reached. During the period of rapid growth of the cells, the process is exothermic, and adequate cooling means should be employed to prevent the temperature from rising considerably above 40° C.

Since B. subtilis requires air for its growth, it is essential to introduce a sufficient flow of air into the fermenter. It has been observed that about 1 liter of air per minute per liter of culture gives good results. The amount of air can be increased above this level, but the culture is more apt to foam excessively. The amount of air can be decreased considerably below the stated level and significant yields will still be obtained. For instance, when air was admitted at 0.2 liter per minute per litre of culture, the yield of subtilin dropped off about 50%. It has been noted that the air flow may be low during the first stages of the incubation, say 0.1 liter per minute per liter of culture, and then increased up to the optimum level as the incubation proceeds.

The cultures produced in accordance with the instant invention were found to contain several subtilin fractions. While the subtilin can be isolated from the culture in several ways, we prefer, however, to use the following isolation technique, whereby an antibacterial fraction is obtained.

The culture is adjusted to a pH of 2.5 by the addition of hydrochloric acid and extracted with one-half volume of normal butanol. To the separated butanol phase is added one-half volume of petroleum ether. The resulting mixture is then extracted three times with 1% aqueous acetic acid using about one-third volume of aqueous acid in each extraction. The aqueous extracts are combined and salt is added to 6% concentration. The precipitate is removed by filtration and washed with 95% alcohol. The precipitate is then dissolved in sufficient water to give a concentration of 1%, the pH adjusted to 4.6 by the addition of sodium hydroxide and salt added to a concentration of 0.4%. The material which precipitates is treated again as described immediately above. After three of these fractionations, the final precipitate is discarded and the aqueous extracts are combined. Salt is then added to a concentration of 10%. The subtilin which precipitates out is collected on a filter, washed with water adjusted to a pH of 7.5 by addition of sodium hydroxide and dried by lyophilization, i. e., dried under vacuum from the frozen state.

Subtilin obtained by the above isolation technique is a white to tan solid material. It is insoluble in dry organic solvents such as ethyl alcohol (above 95%), butyl alcohol, acetone, ether, petroleum ether, chloroform, amyl alcohol, and so forth. It is soluble to the extent of 20% to 25% in salt-free water at pH's below 4 but only slightly soluble (<.3%) at pH 7. Subtilin contains about 14% nitrogen and about 4% sulphur, contains peptide linkages and is inactivated by crystalline pepsin or trypsin.

During the submerged culture, excessive foaming is sometimes encountered. This can be controlled by lowering the pH, by adding chemical de-foaming agents or by mechanical devices. Commercial de-foaming agents suitable for this purpose are available on the market. A suitable example is a monoglyceride dissolved in lard oil; another is octadecanol, which, for convenience in adding small quantities thereof, may be diluted with purified mineral oil (white oil) or lard oil. For mechanical foam breaking, a propeller fixed to the agitator shaft above the surface of the culture has given good results. When there is a sudden increase in volume of foam, the particles of foam contacting the rapidly rotating propellor are separated into their component parts—liquid and gas. The liquid flows back into the vessel and the gas escapes through the top of the fermenter vessel. Other mechanical de-foaming devices known in the art may also be employed.

Having thus described the invention, what is claimed is:

1. A process for preparing subtilin comprising inoculating a sterile nutrient medium with a subtilin-producing strain of Baccilus subtilis, introducing air into the resulting culture at the rate of at least 0.2 volume per minute per volume of culture while vigorously agitating the culture thus to obtain aerobic, submerged conditions, and incubating the culture under these conditions until a substantial amount of subtilin is produced.

2. A process for preparing subtilin comprising inoculating a sterile nutrient medium, adjusted to a pH of about from 5.5 to 7.5, with a subtilin-producing strain of Bacillus subtilis, introducing air into the resulting culture at the rate of least 0.2 volume per minute per volume of culture while vigorously agitating the culture thus to obtain aerobic, submerged conditions, and incubating the culture under these conditions at a temperature of about from 30° C. to 40° C. until a substantial amount of subtilin is produced.

3. The process of claim 2 wherein the nutrient medium is asparagus juice.

4. The process of claim 2 wherein the nutrient medium is asparagus juice containing about from 5 to 20% solids.

5. The process of claim 2 wherein the nutrient medium is beet molasses.

6. The process of claim 3 wherein the nutrient medium contains sugar, amino acids, yeast extract, and mineral salts.

7. A process for preparing subtilin comprising inoculating a sterile nutrient medium with a subtilin-producing strain of Bacillus subtilis, introducing air into the resulting culture at the rate of at least 0.2 volume per minute per volume of culture while vigorously agitating the culture thus to obtain aerobic, submerged conditions, incubating the culture under these conditions until maximum cell volume is reached and for from two to three hours thereafter, and then harvesting the culture.

8. A process for preparing subtilin comprising inoculating a sterile asparagus juice medium, having a solids content of about from 5% to 20% and adjusted to a pH of about from 5.5 to 7.5, with a subtilin-producing strain of Bacillus subtilis, introducing air into the resulting culture at the rate of at least 0.2 volume per minute per volume of culture while vigorously agitating the culture thus to obtain aerobic, submerged conditions, and incubating the culture under these conditions at a temperature of about from 30° C. to 40° C. until maximum cell volume is reached and for from two to three hours thereafter, and then harvesting the culture.

9. The process of claim 7 wherein the nutrient medium is beet molasses.

JOSEPH J. STUBBS.
ROBERT E. FEENEY.
JOHN A. GARIBALDI.
IRVIN C. FEUSTEL.

REFERENCES CITED

The following references are of record in the file of this patent:

UNITED STATES PATENTS

| Number | Name | Date |
|---|---|---|
| 1,745,693 | Nixon | Feb. 5, 1930 |
| 2,291,009 | Underkofler | July 28, 1942 |
| 2,406,174 | Stokes | Aug. 20, 1946 |
| 2,443,989 | Moyer | June 22, 1948 |
| 2,459,139 | Dimick et al. | Jan. 18, 1949 |

OTHER REFERENCES

Humfeld et al., Proc. Soc. Expt. Biol. and Med., 1943, 54, pp. 232–235.

Jansen et al., Arch. Biochem., 1944, 4, pp. 297–309.